United States Patent [19]

Hapke

[11] 4,093,366
[45] June 6, 1978

[54] MOTION PICTURE PROJECTOR APPARATUS AND HIGH INTENSITY PROJECTION ARRANGEMENT

[75] Inventor: Kenyon A. Hapke, Libertyville, Ill.

[73] Assignee: Bell & Howell Company, Chicago, Ill.

[21] Appl. No.: 777,494

[22] Filed: Mar. 14, 1977

[51] Int. Cl.² ............................................. G03B 21/00
[52] U.S. Cl. ..................................... 352/198; 352/202
[58] Field of Search .................................. 352/198, 202

[56] References Cited

PUBLICATIONS

"Big Screen Projection", W. A. Williams, *Super 8 Filmaker*, Fall 1973, pp. 38–39.

*Primary Examiner*—Russell E. Adams
*Attorney, Agent, or Firm*—James V. Lapacek; Roger M. Fitz-Gerald

[57] ABSTRACT

A motion picture projector is provided with a high intensity projection arrangement for improved image projection that also provides a projection lamp having a longer operating life. The projector is interconnected to a power supply unit by a multiconductor umbilical cable to supply all voltage and power requirements of the projector.

The power supply unit is enabled to supply a high voltage starting pulse to the high intensity projection lamp only upon the occurrence of predetermined conditions to prevent shock hazards. The enabling control of the power supply is accomplished by the use of a standard projector control switch and a housing interlock switch on the projection lamp arrangement. Further, the power supply unit is enabled only when the umbilical cable is properly connected between the projector and the power supply unit by means of a return path continuity detector. The power supply unit is provided with an input power cord which is the only supply source connection of the projector and power supply unit arrangement.

Various conventional power supply sources may be utilized as the input to the power supply unit which is further provided with selection apparatus to supply the projector with a predetermined AC supply voltage, for example 110 VAC.

25 Claims, 3 Drawing Figures

MOTION PICTURE PROJECTOR APPARATUS AND HIGH INTENSITY PROJECTION ARRANGEMENT

BACKGROUND OF THE INVENTION

The present invention relates generally to motion picture projectors and more particularly to a projector that is provided with a high intensity projection arrangement and a power supply unit interconnected to the projector to supply all the voltage and power requirements of the projector. The power supply unit and the projector are further provided with a control arrangement to prevent shock hazards and a selection arrangement to facilitate the supply of a standard predetermined voltage to the projector for various conventional supply inputs to the power supply unit.

It is advantageous to provide projection apparatus that is utilized in educational, institutional and entertainment applications with a high intensity light source. In addition to the obvious advantages of clearer and more distinct images at predetermined distances and surrounding light conditions, the high intensity light sources have a significantly longer operating life, as much as 20 times that of conventional lamps, and therefore lower maintenance requirements. Further, it would be desirable to modify existing projectors by replacing the conventional projection lamp by a high intensity lamp with as few modifications and additions to the projector as possible.

The high intensity lamps available for this purpose contain an inert gas, such as xenon, which is under pressure and which is ionized to produce and sustain an arc across a small gap approximately 100 thousandths of an inch which is formed between two electrodes. The power requirements to operate the high intensity projection lamp are a short duration starting pulse of approximately 25,000 volts in magnitude to initiate the arc and a DC supply with capabilities in the range of 15 to 20 volts at approximately 20 amps to sustain the arc.

In order to facilitate the modification of conventional projectors as well as to maintain the size and weight of the projector within reasonable limits for average operating circumstances, it is desirable to provide the circuitry supplying the power requirement of the high intensity projection lamp in an enclosure separate from the projector housing. Thus, the projector and the power supply unit are interconnected by a cable supplying the 25,000 volt starting pulse and the DC sustaining voltage. To further minimize the modifications to conventional projectors and to increase the adaptability of the high intensity projector apparatus, it is also desirable to operate the apparatus from various conventional input supply sources as found in military and international applications.

However, while the above-described arrangement is generally suitable for operation of high intensity projection apparatus, substantial shock hazards exist and undesirable operating conditions may occur.

SUMMARY OF THE INVENTION

Accordingly, it is a principal object of the present invention to provide an improved high intensity projection apparatus that is easily adaptable to conventional projector apparatus and avoids one or more disadvantages of the above-described arrangements.

It is another object of the present invention to provide a high intensity projection apparatus that includes a power supply that is enabled to supply various operating voltages through an umbilical cable to a projector unit only upon the occurrence of a predetermined number of operating conditions to prevent shock hazards and avoid projection lamp failure.

It is a further object of the present invention to provide a modification kit to modify a conventional projector unit in an efficient manner.

It is yet another object of the present invention to provide a power supply unit and a modification kit for modifying a conventional projector to result in a high intensity projection apparatus that eliminates shock hazards.

It is a still further object of the present invention to provide a power supply unit for use with a high intensity projector that provides all the power supply requirements to the projector and that is selectively enabled to prevent shock hazards and undesirable operating conditions.

It is another object of the present invention to provide a power supply unit for use with a high intensity projector that includes an enabling arrangement cooperating with a multiconductor umbilical cord to the projector and projector control apparatus to enable the power supply only upon the occurrence of predetermined conditions.

It is a further object of the present invention to provide a power supply unit for use with a high intensity projector that includes selection apparatus for supplying a predetermined supply voltage to the projector unit for various conventional power supply input voltages.

These and other objects are efficiently achieved by providing a high intensity projection arrangement in a conventional motion picture projector unit for use with and powered by a power supply unit that is enabled only upon the occurrence of predetermined conditions to prevent shock hazards and to prevent component failure.

The predetermined conditions in one arrangement are defined by the projector being in certain operating modes, a high intensity lamp interlock switch being actuated and an umbilical cord that interconnects the power supply unit and the projector being properly connected. The operating mode conditions are determined by a control switch of the projector.

The power supply unit in one arrangement is provided with selection apparatus for supplying a predetermined supply voltage to the projector while the power supply unit is supplied by various conventional voltage inputs. The enablement of the power supply unit is accomplished by a return path continuity detector arrangement. The continuity detector arrangement is provided in one arrangement by the continuity of a path from the power supply unit, through the umbilical cable, through various control and safety switches in the projector and back through the umbilical cable to the power supply unit.

BRIEF DESCRIPTION OF THE DRAWINGS

The invention, both as to its organization and method of operation, together with further objects and advantages thereof will best be understood by reference to the following detailed description taken in connection with the accompanying drawings wherein.

DESCRIPTION OF THE PREFERRED EMBODIMENT

Figure 1:
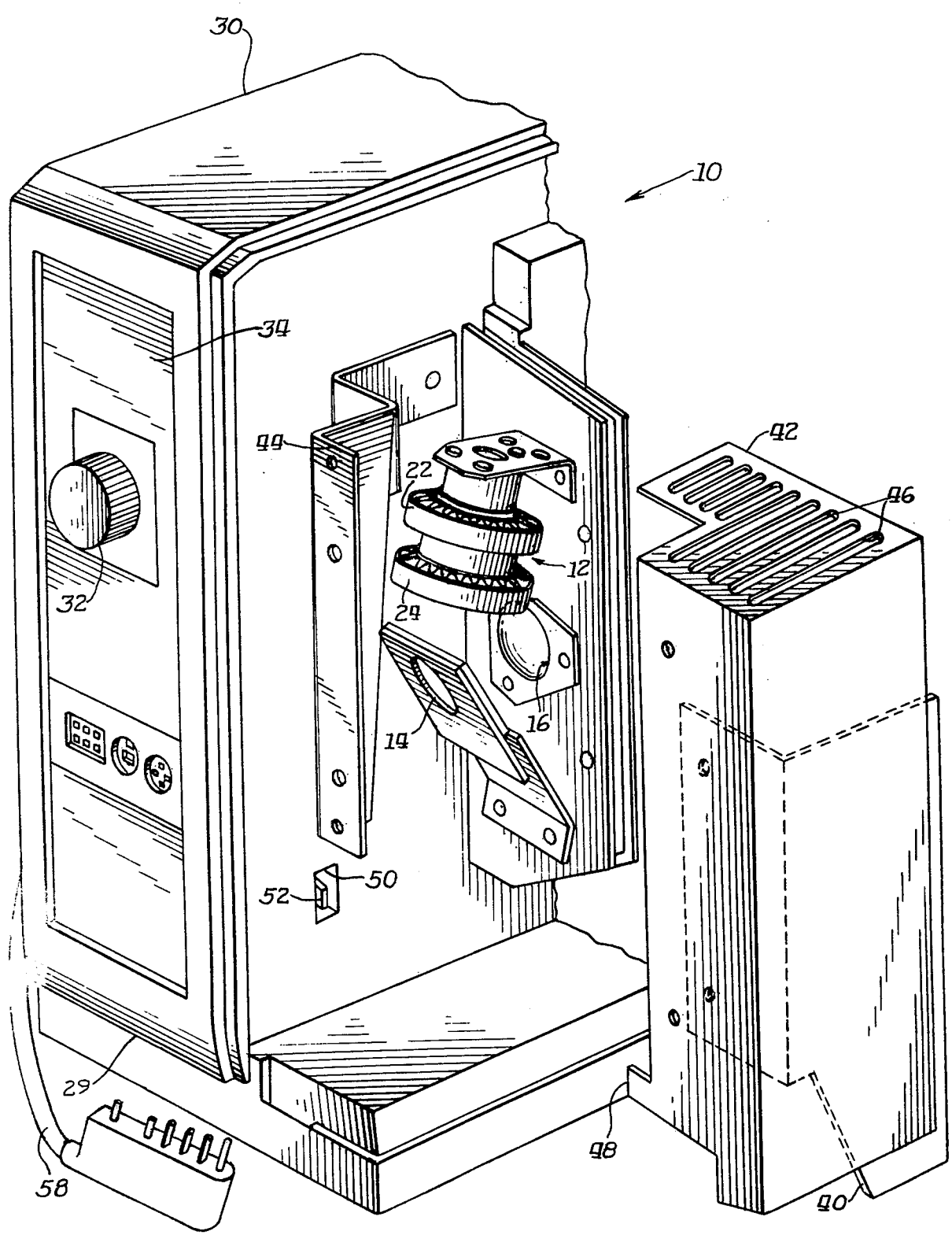
FIG. 1 is a front perspective view of a motion picture projector, with certain parts exploded for clarity, that is provided with a high intensity projection arrangement constructed in accordance with the principles and teachings of the present invention.
Figure 2:
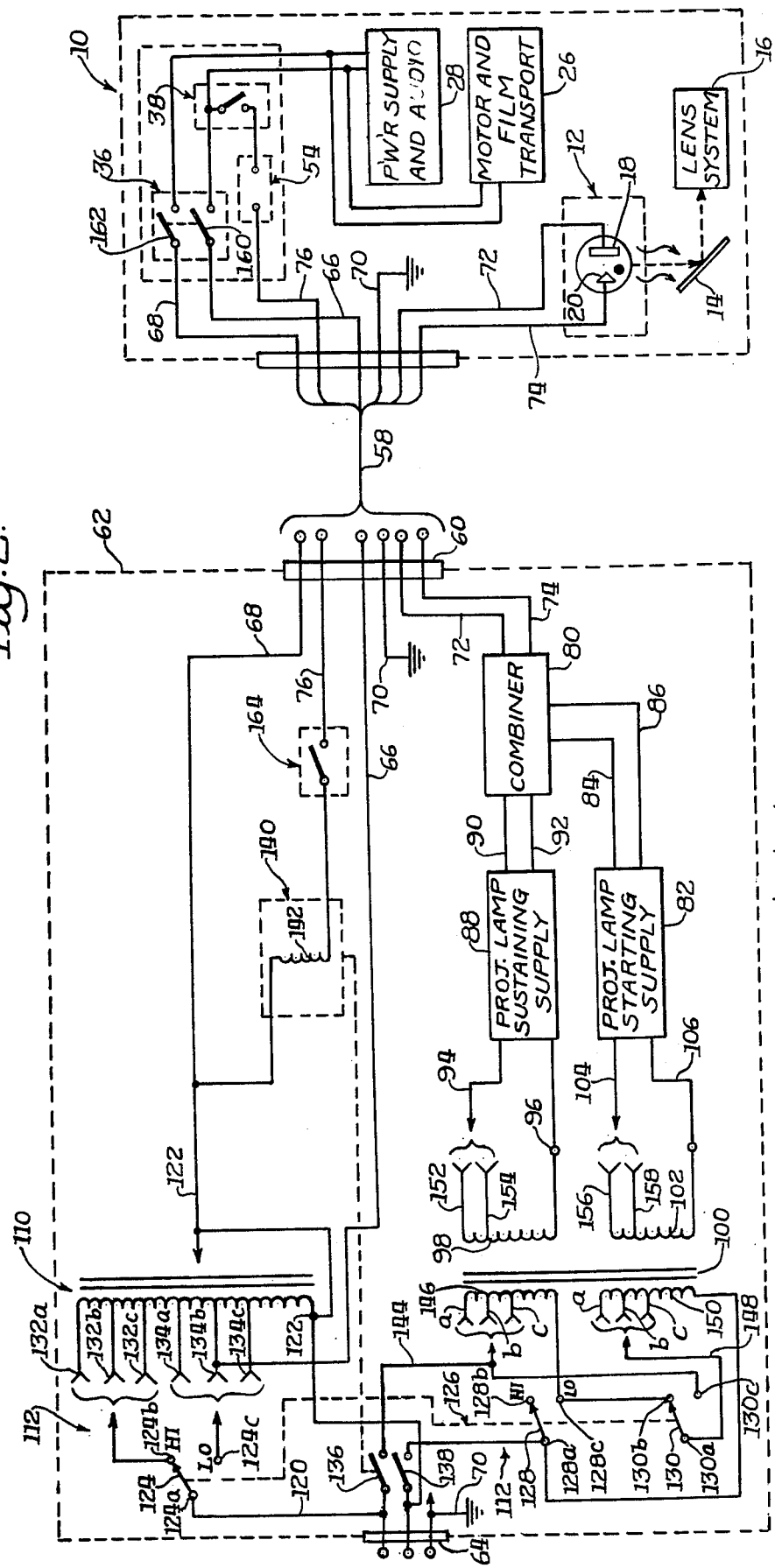
FIG. 2 is an electrical schematic drawing and pictorial representation of the high intensity projector of FIG. 1 as interconnected with a power supply unit for the projector.
Figure 3:
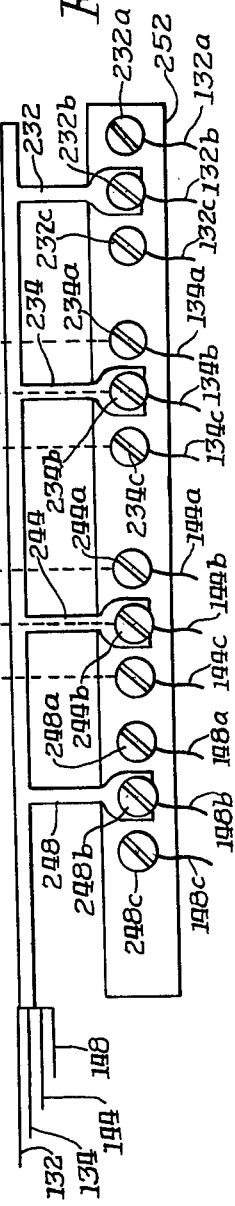
FIG. 3 is an elevational view of a portion of the power supply unit of FIG. 2 illustrating a selection arrangement of the power supply unit.

Referring now to FIGS. 1 and 2, a motion picture projector constructed in accordance with the principles of the present invention and referred to generally at 10 is provided with a high intensity projection lamp 12 and an associated dichromatic mirror 14 and lens system referred to generally at 16.

The high intensity projection lamp 12 is a long operating life type which contains an inert gas, xenon for example, within a glass and ceramic envelope. In operation the inert gas is ionized to provide an arc across a gap formed between two electrodes 18 and 20. The arc is started by a high voltage pulse, 25,000 volts for example, and sustained during operation by a low DC voltage in the range of 12 to 25 volts. In a specific embodiment the operating power requirements are a 15 volt supply and the high intensity projection lamp 12 carries 20 amps of current.

This type of lamp is desirable for motion picture projectors due to the high intensity of the light that is radiated and the high temperature white light operating characteristics. Further, the high intensity lamp 12 exhibits an operating life that is 10 to 20 times as long as that of conventional projection lamps such as the quartz-halogen type.

To provide long-life operation, the projection lamp 12 is further provided with a pair of circular finned metallic heat transfer rings 22 and 24. The light produced by the lamp 12 is reflected by the diagonally mounted dichromatic mirror 14 which is designed to permit infrared radiation to be transmitted directly through and to reflect the visible light through the lens system 16.

The projector 10 includes conventional motor and film transport apparatus referred to generally at 26 and other conventional arrangements referred to generally at 28, identified as the power supply and audio stages. The operative components of the projector 10 are carried by and mounted in a housing defined by a generally rectangular flat base portion 29 and an upstanding concave edgewall portion 30. A control selection knob 32 is mounted in a control housing panel section 34 which is effective through a control shaft to operate a main projector function control switch which includes a projection lamp switch 38.

A main power control switch 36 is shown as a double pole-single throw configuration for simplicity. The main power control switch 36 is also effective to operate a ventilating fan (not shown) whenever the switch is actuated. The control knob 32 is positionable in an off mode and in a number of operational mode positions. Further, in predetermined operational modes, such as normal forward and reverse film transporting modes, the projection lamp switch 38 (single pole-single throw) is actuated to control operation of the projection lamp 12 as will be explained in detail hereinafter. A separately actuable lamp control switch 38 may also be provided in a specific embodiment.

In accordance with an important aspect of the present invention, the high intensity projection lamp 12 is enclosed by several protective housing covers 40 and 42 to prevent shock hazards from the 25,000 volt starting pulse, protect the operator from touching the hot lamp surface and surrounding components and to contain radiated light within the projector apparatus. The first inner lamp housing cover 40 interfits around the lamp 12 and the associated mounting components and housing portions including a flange member 44. The inner protective housing cover 40 is generally open at the top and bottom when interfitted with the housing edgewall 30 and lamp assembly to permit ventilation and cooling effects and is secured to the flange 44 by suitable fasteners such as screws positioned through holes in the flange and the cover.

The second outer cover 42 is positioned over the inner cover 40 to further enclose the lamp assembly and is secured to the flange 44. The outer protective cover 42 is also provided with numerous ventilating passages 46 of a generally elongated oval shape which are dimensioned to prevent the insertion of a human finger. An extending foot portion 48 is provided at the bottom of the protective cover 42 and is aligned with a receiving passage 50 in the projector housing edgewall 30.

In accordance with further important aspects of the present invention, an actuator mechanism 52 of a lamp housing safety interlock switch 54 is disposed within the passage 50 to be contacted by the foot portion 48 when the outer protective cover 42 is properly positioned. The switch actuator mechanism 52, which may be an actuator button or a lever in specific embodiments, when contacted actuates the lamp housing safety interlock switch 54, a single pole-single throw configuration in a specific embodiment. The safety interlock switch 54 is utilized to control the operation of the projection lamp power supply apparatus.

The projector 10 is operated and provided with all electrical supply requirements through a six lead umbilical cable 58 mounted in the control housing panel section 34 along with various audio and remote projector control connectors. A connector socket 60 of a power supply and control unit referred to generally at 62 is suitably arranged or "keyed" by lead configuration and conventional connector design principles to accept a mating connector plug of the six lead umbilical cable 58 in a predetermined orientation.

In accordance with further important aspects of the present invention, the power supply and control unit 62 is connected to a conventional power source through a connector plug 64. The power supply and control unit 62 is designed to accept power source inputs of various voltages and frequencies while supplying the projector 10 through the umbilical cable 58 with a single predetermined operating supply voltage. For example, in a specific embodiment, the predetermined voltage supplied to the projector 10 is 110 VAC and the input supply to the power supply and control unit 62 may include 100, 110, 120, 200, 220 or 240 volts AC at source frequencies of either 50 or 60 Hz. Further, the power supply and control unit 62 includes a control enabling arrangement to enable the operating supply requirements for the high intensity projection lamp 12 only upon the occurrence of a number of predetermined conditions. In a preferred specific embodiment these conditions are the proper orientation of the main power control switch 36, the operation of the ventilation device within the projector 10, the actuation of the projection lamp switch 38, the actuation of the lamp housing safety interlock switch 54 and the proper connection of the umbilical cable 58 between the power supply and control unit 62 and the projector 10. The proper connection of the umbilical cable 58 is established by a continuity path being detected through the umbilical cable 58.

More specifically, the umbilical cable 58, and the connector socket 60 each include a 110 VAC pair 66,68; a ground line 70; a projection lamp supply pair 72, 74 (twisted pair in a specific embodiment) and a continuity return line 76. The projection lamp supply pair 72, 74 is connected to the electrodes 18 and 20 of the projection lamp 12.

The projection lamp supply pair 72, 74 are connected within the power supply and control unit 62 to the output of a combiner stage 80 which is effective to couple the high voltage starting pulse at a first input and the low DC voltage sustaining supply at a second input. The first input of the combiner stage 80 is connected to the output of a projection lamp starting supply stage 82 on lines 84, 86. The second input is connected to the output of a projection lamp sustaining supply stage 88 on lines 90, 92.

The projection lamp sustaining supply 88 has an AC input pair 94, 96 which is arranged to supply a fixed AC voltage from a step-down secondary winding 98 of a projection lamp supply transformer 100. The projection lamp sustaining supply stage 88 is arranged to generate a 15 volt DC output on lines 90, 92 from the AC input on lines 94, 96 by suitable recitification and filtering.

The projection lamp starting supply 82 is arranged to be supplied by a step-up secondary winding 102 on lines 104, 106 to produce the 25,000 volt short duration pulse on output lines 84, 86. The projection lamp starting supply 82 utilizes a spark gap device and a switch contact of a relay controlled by the projection lamp sustaining supply 88. The switch contact is operated when the sustaining supply 88 generates the DC voltage thereby enabling the generation of the starting pulse. It should be understood that other detecting and switching arrangements may also be utilized to enable the generation of the starting pulse as the sustaining supply is enabled and rises to the operating voltage. The primary winding of the transformer 100 is enabled only when the predetermined conditions occur as will be explained in detail hereinafter preventing shock hazards that could otherwise be present at the output socket 60 of the power supply and control unit 62 and/or at the projection lamp 12.

In accordance with further important aspects of the present invention, the power supply and control unit 62 includes an autotransformer arrangement 110 and a selection arrangement referred to generally at 112 to provide the projector 10 with a predetermined supply source such as 110 VAC and the high intensity projection lamp 12 with a constant 15 VDC supply regardless of the input voltage to the power supply and control unit 62 at the input connector plug 64.

More specifically, the input connector plug 64 includes a ground lead 70 and an AC input supply pair 120, 122 where line 120 is the so-called hot lead and line 122 is the so-called neutral lead, assuming a polarized plug arrangement is utilized. The AC input line 120 is connected to the common contact 124a of a first pole 124 of a three pole — two position range selection switch arrangement 126. The second and third poles, 128 and 130 respectively, are utilized to control the AC input to the primary side of the projection lamp supply transformer 100. The paired AC supply line 122 is connected to the common or low side of the autotransformer 110.

A first or high position 124b of the switch layer or pole 124 is connected to a high voltage range line 132 and a second or low position 124c is connected to a low voltage range line 134. The selection arrangement 112 provides for the selective connection of the high voltage range line 132 to one of several autotransformer taps 132a, 132b or 132c and the low voltage range line 134 to one of several autotransformer taps 134a, 134b or 134c.

To this end and in accordance with important aspects of the present invention, the high voltage range lines 132 and 134 are connected respectively to bifurcated contact terminals 232 and 234. The bifurcated contact terminals 232 and 234 are carried by and spaced apart along a common terminal bar 250 which is arranged parallel to a terminal block 252 which includes several terminal screws 232a, 232b, 232c, 234a, 234b and 234c corresponding to and respectively connected to the autotransformer winding taps 132a, 132b, 132c, 134a, 134b and 134c. The bifurcated contact terminals 232 and 234 are positioned and arranged relative to the terminal screws to allow simultaneous connection of the terminals 232 and 234 to either terminal screws 232a, 234a; 232b, 234b; or 232c, 234c respectively. The autotransformer winding taps 132a, 132b and 132c correspond to the high range voltages of 240, 220 and 200 volts respectively and the winding taps 134, 134b and 134c correspond to the low range voltages of 120, 110 and 100 volts respectively. To select the desired autotransformer winding taps corresponding to the voltage of the input source on lines 120, 122, the terminal bar 250 is moved to the correct position whereupon the appropriate terminal screws are tightened to secure the corresponding bifurcated contact terminals 232 and 234.

Thus, if the input source on lines 120, 122 is either 200 volts or 100 volts, the bar 250 is oriented to align and connect the terminals 232 and 234 with terminal screws 232c and 234c respectively. Further, if the input source is one of the high range voltages 200, 220 or 240 volts, the switch 124 is positioned to the high voltage range position 124b. Similarly, if the input source is any one of the low range voltages 100, 110 or 120 volts, the switch 124 is positioned to the low voltage range position 124c. The autotransformer winding tap 134b always provides 110 VAC with respect to the common autotransformer line 122 when the switch 124 and the terminal bar 250 are properly arranged according to the input source voltage. The 110 VAC autotransformer tap 134b is connected to the AC output line 66 and the line 122 is connected to the paired AC output line 68 of the output connector socket 60.

The second and third poles or switch layers 128 and 130 of the control switch 126 of the selection arrangement 112 are utilized to supply the proper AC voltage to the primary side of the projection lamp supply transformer 100. Specifically, the AC input lines 120 and 122 are each connected respectively through in-line fuses and contact pairs 136 and 138 of a relay arrangement 140 having an associated relay coil 142. The supply line 120 is connected through the relay contact pair 136 to a first voltage range line 144 associated with a first primary winding 146 of the transformer 100 and to the low position 130c of the switch layer or pole 130. The supply line 122 is connected through the relay contact pair 138 to the common contact 128a of the switch layer 128 and to the common or low side of a second primary winding 150. The second primary winding 150 includes three winding taps 148a, 148b and 148c corresponding to high, nominal and low input source voltages. The winding taps are selectively connected to a second voltage range line 148 which is connected to the common contact 130a of the switch layer 130. The high position contact 130b is connected to the low position contact 128c of the switch layer 128 of the range selection switch 126 and also to the bottom or low end of the first primary winding 146. The first primary winding 146 also includes three winding taps 144a, 144b and 144c corresponding to high, nominal and low input source voltages which are selectively connected to the first voltage range line 144.

In accordance with the selection arrangement 112 of the present invention, the first and second voltage range lines 144 and 148 are respectively connected to bifurcated contact terminals 244 and 248 carried by and spaced apart along the terminal bar 250. The terminal strip or block 252 includes three terminal screws 244a, 244b and 244c which are respectively connected to the winding taps 144a, 144b and 144c of the primary winding 150 and positioned adjacent and aligned with the bifurcated contact terminal 244. Similarly, the terminal block 252 includes three terminal screws 248a, 248b and 248c which are respectively connected to the winding taps 148a, 148b and 148c of the second primary winding 150 and positioned adjacent and aligned with the bifurcated contact terminal 248.

As the terminal bar 250 is moved to one of the three positions a, b or c, as described hereinbefore in connection with the autotransformer 110, the terminals 244, 248 are respectively aligned and connected to the terminal screws 144a, 148a; 144b, 148b; or 144c, 148c. As the voltage range selection switch 126 is moved to either of the high or low positions, the three switch layers or poles 124, 128 and 130 are operated together to provide a connection of the supply lines 120 and 122 either across each of the windings 146 and 150 to connect them in parallel in the low position or to connect the windings 146 and 150 in series in the high position. Thus, when the voltage range selection switch 126 is in the high position, for input source voltages of 200, 220 and 240 volts, the source voltage on lines 120, 122 is connected across the series connection of the primary windings 146 and 150. For input source voltages of 100, 110 and 120 volts with the voltage range selection switch 126 in the low position, the source voltage on lines 120, 122 is connected in parallel across each of the primary windings 146 and 150. As before, the voltage range terminals 244 and 248 are connected to the respective "a" positions to accommodate an input source voltage of 240 or 120 volts, to the "b" position for an input of 220 or 110 volts or to the "c" position for an input of 200 or 100 volts.

In summary, the voltage range selection switch 126 of the selection arrangement 112 is effective to accommodate the high range of 200, 220 and 240 volts and the low range of 100, 110 and 120 volts by positioning the switch in either the high or low positions. Further, the arrangement of the terminal bar 250 and the terminal block 252 of the selection arrangement 112 is effective to accommodate the high (240, 120 volts), the nominal (220, 110 volts) and the low (200, 100 volts) voltages of each of the high range and low range of input voltages by positioning and connecting the terminals 232, 234, 244 and 248 to either the a, b or c positions and corresponding terminal screws. Consequently, the projector 10 is provided with an AC supply voltage of 110 volts for any of the input voltages 100, 110, 120, 200, 220 or 240 volts and the projection lamp supply stages 88 and 82 are provided with appropriate operating voltages eliminating the necessity of further regulation.

The selection arrangement 112 also includes an arrangement of a terminal block and a terminal bar similar to the terminal block 252 and the terminal bar 250 to provide a selection for alternate 50 Hz and 60 Hz input source operation. Secondary winding taps 152 and 154 are provided on the stepdown secondary winding 98 and winding taps 156 and 158 are provided on the step-up secondary winding 102 for selective connection to input lines 94 and 104 respectively. Similarly to the arrangement described hereinbefore, the input lines 94 and 104 are connected to respective bifurcated contact terminals and positioned and carried by a common terminal bar for respective connection with either winding tap points 152, 156 or 154, 158.

It should be understood that contact terminals of other designs and configurations such as a quick-disconnect type may also be utilized for the contact terminals 232, 234, 244, 248 and the 50-60 Hz terminals. Similarly, other connection devices may be utilized in place of the terminal block 252. For example, a multiple terminal connector arrangement may be utilized wherein the terminals of a connector plug correspond to the terminals 232, 234, 244 and 248 and a connector socket is provided having a terminal socket corresponding to each of the terminal screws 232a, 232b, 232c, 234a, 234b, 234c, 244a, 244b, 244c, 248a, 248b and 248c. Thus, the connector plug provides the functions of the terminal bar 250 and the a, b and c positions are established by the insertion of the connector plug into various spaced apart positions on the connector socket.

In accordance with yet further important aspects of the present invention, the power supply and control unit 62 is effective to prevent enablement of the projection lamp supply stages 82 and 88 and the transformer 100 through the relay switch contacts 136 and 138 until predetermined operating conditions have occurred to prevent shock hazards and undesirable operational conditions.

Specifically, the AC supply lines 66 and 68 are connected through the umbilical cable 58 to respective poles 160 and 162 of the main projector control switch 36. The AC supply line 66 is connected through the pole 160, the projection lamp switch 38 and the lamp housing safety interlock switch 54 to the continuity return line 76.

When the main power control switch 36 is positioned to the operating mode position, the projection lamp swith 38 is actuted (normal porjection modes), the umbilical cable 58 is properly connected and the lamp housing cover 42 is in the correct position, a path is completed from the AC supply line 66 through the switch contacts of switches 36, 38 and 54 and through the continuity return line 76 of the umbilical cable 58 to the power supply and control unit 62.

The continuity return line 76 is connected through a normally closed thermal limit switch 164, which opens upon the occurrence of undesirably high operating temperatures in the power supply and control unit 62, to one end of the relay coil 142. The other end of the relay coil 142 is connected to the AC supply line 68. Thus upon the path being completed from the AC supply line 66 back through the continuity return line 76, the relay 140 is operated and the contacts 136 and 138 are closed to enable the connection of the supply lines 120 and 122 to the primary windings 146 and 150 of the projection lamp supply transformer 100.

In accordance with important aspects of the present invention, the starting pulse and DC operating voltage will not be generated on line pair 72, 74 unless the umbilical cable 58 is properly connected between the power supply and control unit 62 and the projector 10; the main power control switch 36 is actuated, the projection lamp control switch 38 is operated corresponding to the control selection knob 32 being in certain predetermined positions, and the protective housing cover 42 is properly positioned over the projection lamp 12. Therefore, the shock hazards that might be present at the projection lamp 12, at the output of the power supply and control unit 62 and at the projector end of the umbilical cable 58 are eliminated. Further, since the control enablement path is made through the main power control switch 36, an undesirable operating condition is avoided in which the ventilation device is inoperative resulting in the failure or a shortened operating life of the projection lamp 12. The arrangement of the umbilical cable 58 as the only power source or supply interconnection with the projector 10 further serves to avoid shock hazards which might be present if individual AC line supply cables were utilized for the power supply unit 62 and the projector 10 and an additional interconnecting cable for the DC projection lamp supply were provided. The arrangement of the power supply and control unit 62 and the projector 10 as separate units housed in separate packages and the utilization of the umbilical cable 58 with associated continuity return path further provides a high intensity projection apparatus wherein a conventional projector may be utilized with acceptable dimensions and of reasonable weight in cooperation with a separate power supply and control unit.

It shouldbe understood that the continuity return pay may also be accomplished by the utilization of an additional line in the umbilical cable 58 wherein a path may be detected with a voltage or signal other than the AC supply line. For example, if an additional switch contact is provided on the main control switch for continuity return purposes or if it is not required to connect the main control switch in series with the continuity return path, the return path can be detected by the use of other source voltages or methods and an additional line in the umbilical cable. In these cases, the AC and the DC supply sources could both be enabled upon the occurrence of the same or different predetermined conditions. In a specific embodiment, separate enabling controls for the AC and DC supply sources is contemplated. In another specific embodiment, a number of different continuity return control paths is contemplated wherein the AC supply is enabled through a first return path upon the detection of the umbilical cable being properly interconnected and the DC supply is enabled through a second return path upon the further detection of the operation of the projection lamp switch and/or the ventilation device. The same signal lead from the power supply and control unit to the projector may be utilized for the various return continuity paths. Further, control devices other than the relay 140 may be utilized to detect the continuity return path and enable the power supply. For example, a low voltage may be utilized to operate an optical isolator device to control the switching of the power supply and control unit.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Motion picture projection apparatus comprising:
   a motion picture projection unit having a high intensity light source, film transporting apparatus and switch means for controlling the operation of said motion picture projection unit;
   a power supply unit adapted to be connected to an AC supply source, said power supply unit comprising means for generating the operating supply requirements for said high intensity light source and means for enabling the operation of said generating means;
   detachable means for interconnecting said motion picture projection unit and said power supply unit, said interconnecting means comprising a multiple conductor cable; and
   means for detecting the proper interconnection of said power supply unit and said motion picture projection unit, said detecting means comprising a return continuity path conductor located within said multiple conductor cable, said return continuity path conductor being connected through said controlling switch means, said detecting means being effective to control said enabling means.

2. The motion picture projection apparatus of claim 1 wherein said controlling switch means comprises a high intensity light source switch connected in series with said return continuity path conductor and a predetermined one of said multiple conductors in said multiple conductor cable, said high intensity light source switch being actuated in predetermined operational modes.

3. The motion picture projection apparatus of claim 2 wherein said predetermined one of said multiple conductors is one line of an AC supply pair in said multiple conductor cable.

4. The motion picture projection apparatus of claim 3 wherein said controlling switch means further comprises a main mode selector switch which switches said AC supply pair, said main mode selector switch being connected in series with said high intensity light source switch.

5. The motion picture projection apparatus of claim 4 wherein said motion picture projection unit includes ventilation apparatus and said main mode selector switch includes means for controlling said ventilating apparatus.

6. The motion picture projection apparatus of claim 4 wherein said main mode selector switch includes a first unactuated position corresponding to an off mode of the motion picture projection unit and a plurality of actuated positions corresponding to operational modes.

7. The motion picture projection apparatus of claim 6 wherein said main mode selector switch actuates said high intensity light source in predetermined ones of said plurality of operational modes.

8. The motion picture projection apparatus of claim 1 wherein said motion picture projection unit further comprises a housing cover for enclosing said high intensity light source and said controlling switch means comprises a high intensity light source housing interlock switch connected in series with said return continuity path conductor and a predetermined one of said multiple conductors in said multiple conductor cable, said high intensity light source housing interlock switch including an actuator which is actuated when said high intensity light source housing cover is properly positioned.

9. The motion picture projection apparatus of claim 8 wherein said high intensity light source housing cover comprises an extending foot portion for engaging said high intensity light source housing interlock switch actuator.

10. The motion picture projection apparatus of claim 2 wherein said enabling means comprises means for selectively switching the AC supply source input to said generating means and means responsive to said detecting means for actuating said selective switching means.

11. The motion picture projection apparatus of claim 10 wherein said predetermined one of said multiple conductors is one line of an AC supply pair in said multiple conductor cable, said actuating means is a relay coil connected between said return continuity path conductor and the second line of said AC supply pair, and said selective switching means comprises a plurality of contact pairs operated by said relay coil.

12. The motion picture projection apparatus of claim 1 wherein the voltage and frequency of said AC supply source is one of a plurality of predetermined voltages and frequencies and said power supply unit further comprises means connected to the AC supply source input for supplying a predetermined AC supply source voltage to said motion picture projection unit on two lines of said multiple conductor interconnection cable.

13. The motion picture projection apparatus of claim 12 wherein said predetermined AC source voltage supplying means comprises an autotransformer arrangement having a common lead and a plurality of autotransformer winding taps corresponding to said plurality of predetermined AC supply source voltages and means for selectively connecting said AC supply source input to a predetermined one of said plurality of autotransformer winding taps.

14. The motion picture projection apparatus of claim 13 wherein said selective connecting means comprises: a voltage range switch connected in one line of said AC supply source input having a common contact, a first high range position contact and a second low range position contact; a pair of terminals, each of said terminals being connected to a respective one of said voltage range switch contacts; a common supporting element carrying said terminals in a predetermined spaced apart relationship; and means having a terminal connection point corresponding to each of said plurality of autotransformer winding taps for detachably securing said terminals.

15. The motion picture projection apparatus of claim 14 wherein said plurality of autotransformer winding taps includes a first plurality of winding taps corresponding to a high range of AC supply source input voltages and a second plurality of winding taps corresponding to a low range of AC supply source input voltages, said high range terminal being connected to one of said first plurality of winding tap terminal connection points, said low range terminal being connected to one of said second plurality of winding tap terminal connection points.

16. The motion picture projection apparatus of claim 15 wherein said first and second plurality of winding taps each includes a winding tap corresponding to a high, a nominal and a low AC supply source input voltage.

17. The motion picture projection apparatus of claim 16 wherein said high, nominal and low AC supply source input voltages in said high voltage range are 240, 220 and 200 VAC respectively.

18. The motion picture projection apparatus of claim 17 wherein said high, nominal and low AC supply source input voltages in said low voltage range are 120, 110 and 100 VAC respectively.

19. The motion picture projection apparatus of claim 14 wherein said high intensity light source is operated by initially applying a high voltage starting pulse and a steady-state low voltage for continued operation and said generating means comprises: a transformer having first and second primary windings; a step-down secondary winding; a step-up secondary winding; a high intensity light source starting pulse stage connected to said step-up secondary winding; and a high intensity light source steady-state stage connected to said step-down secondary winding, said power supply unit further comprising second means connected to the AC supply source input for supplying a predetermined AC voltage to said high intensity light source starting pulse and steady-state stages.

20. The motion picture projection apparatus of claim 19 wherein said second high intensity stage supplying means comprises a first plurality of winding taps on said first primary winding, a second plurality of winding taps on said second primary winding, and second means for selectively connecting said AC supply source input to predetermined ones of said first and second plurality of winding taps.

21. The motion picture projection apparatus of claim 20 wherein said second selective connection means comprises:
  a second and a third voltage range switch each having a common contact, a first high range position contact and a second low range position contact, said first, second and third voltage range switches each forming one pole of a three pole switch configuration; and
  a second pair of terminals, one of said second pair of terminal connectors being connected to a first line of the AC supply input source and the other being connected to the common contact of said third voltage range switch, said second pair of terminals being carried by and in a predetermined spaced apart relationship on said common supporting element,
  said detachable securing means further comprising a terminal connection point corresponding to each one of said first and second plurality of winding taps for detachably securing said second pair of terminal connectors, said low range position contact of said second voltage range switch being connected to said high range position contact of said third voltage range switch, said low range position contact of said third voltage switch being connected to said first line of said AC supply source input, said common contact of said second voltage range switch being connected to a second line of said AC supply source input, the common lead of said first primary winding being connected to said low range position contact of said second voltage range switch, said common lead of said second primary winding being connected to said second line of said AC supply source input.

22. The motion picture projection apparatus of claim 21 wherein said first and second plurality of winding taps correspond to high, nominal and low voltage or said AC supply source input.

23. The motion picture projection apparatus of claim 22 wherein said high, nominal and low voltage taps correspond to AC supply input voltages of 240, 120 VAC; 220, 110 VAC; and 220, 100 VAC respectively.

24. The motion picture projection apparatus of claim 19 wherein said second predetermined AC voltage supplying means comprises means for connecting said first and second primary winding in series when said AC supply input is in a predetermined high voltage range and for connecting said first and second primary winding in parallel when said AC supply input is in a predetermined low voltage range.

25. Motion picture projection apparatus utilizing a high intensity light source that is operated by initially applying a high voltage starting pulse and a steady-state low voltage for continued operation, the motion picture projection apparatus comprising:

a motion picture projector which houses the high intensity light source, film transporting apparatus and switch means for conditioning said projector to several operational modes;

a power supply and control unit adapted to be connected to an AC supply source, said power supply and control unit comprising means for generating said high voltage starting pulse and said steady-state low voltage for operation of said high intensity light source and means for enabling the operation of said generating means; and detachable means for interconnecting said motion picture projector and said power supply and control unit and for supplying all the operating power requirements of said motion picture projector, said interconnecting means comprising a multiple conductor cable, said multiple conductor cable including a continuity return path conductor which is interconnected through said switch conditioning means to said enabling means, said enabling means being responsive to said continuity return path conductor.

* * * * *